(12) United States Patent
McAlister et al.

(10) Patent No.: US 10,561,119 B2
(45) Date of Patent: Feb. 18, 2020

(54) PLANT MATERIAL FEEDER FOR ANIMALS

(71) Applicants: Glen Leslie McAlister, Savery, WY (US); Isaac John Spear, Oklahoma City, OK (US)

(72) Inventors: Glen Leslie McAlister, Savery, WY (US); Isaac John Spear, Oklahoma City, OK (US)

(73) Assignee: WESTERN PRO FEEDERS, LLC, Oklahoma City, OK (US)

(*) Notice: Subject to any disclaimer, the term of this patent is extended or adjusted under 35 U.S.C. 154(b) by 77 days.

(21) Appl. No.: 15/732,211

(22) Filed: Oct. 3, 2017

(65) Prior Publication Data

US 2019/0098863 A1   Apr. 4, 2019

(51) Int. Cl.
*A01K 1/10* (2006.01)
*A01K 5/01* (2006.01)

(52) U.S. Cl.
CPC ............... *A01K 1/105* (2013.01); *A01K 1/10* (2013.01); *A01K 5/01* (2013.01)

(58) Field of Classification Search
CPC .......... A01K 1/10; A01K 5/01; A01K 5/0107; A01K 5/0105
USPC .......................................... 119/58, 60, 61.31
See application file for complete search history.

(56) References Cited

U.S. PATENT DOCUMENTS

| | | | |
|---|---|---|---|
| 387,892 A | 8/1888 | Light | |
| 3,777,713 A | 12/1973 | Deats | |
| 4,580,528 A | 4/1986 | Kendall | |
| D286,692 S | 11/1986 | DePew | |
| 5,000,122 A * | 3/1991 | Smith | A01K 5/01 119/58 |
| 5,158,040 A | 10/1992 | Martin | |
| 5,311,840 A | 5/1994 | Rumbaugh | |
| 5,337,699 A | 8/1994 | Dyson | |
| 5,386,800 A | 2/1995 | Pirok | |
| D423,735 S | 4/2000 | Lile | |
| D451,649 S | 12/2001 | Lovell | |
| 6,672,247 B1 * | 1/2004 | Lienemann | A01K 1/10 119/60 |
| 6,691,642 B2 | 2/2004 | Dollahan | |
| 6,789,505 B1 | 9/2004 | Lienemann | |
| D548,896 S | 8/2007 | Stewart | |
| 7,418,924 B2 | 9/2008 | Klene | |
| 8,720,373 B1 | 5/2014 | Tesinsky | |
| 9,468,193 B2 | 10/2016 | Gramza | |
| 9,567,169 B2 * | 2/2017 | Camilletti | A01K 5/01 |
| 2002/0195060 A1 * | 12/2002 | Dollahan | A01K 1/10 119/58 |

(Continued)

FOREIGN PATENT DOCUMENTS

GB    916043    1/1963
GB    927190    5/1963

(Continued)

OTHER PUBLICATIONS

Tray Hay Feeder, accessed May 2017 balejail.com/ca/tray-hay-feeder/.

(Continued)

*Primary Examiner* — Yvonne R Abbott-Lewis
(74) *Attorney, Agent, or Firm* — Henry L. Smith, Jr.

(57) ABSTRACT

An exemplary embodiment includes a plant material feeder for animals including a plant material bunker, a feeder cone and a base.

18 Claims, 9 Drawing Sheets

(56) References Cited

U.S. PATENT DOCUMENTS

| | | | | |
|---|---|---|---|---|
| 2010/0212597 A1* | 8/2010 | Wolfe | ................. | A01K 5/0107 |
| | | | | 119/58 |
| 2010/0263597 A1* | 10/2010 | Kerns | ..................... | A01K 5/01 |
| | | | | 119/60 |
| 2015/0020740 A1 | 1/2015 | Lacey | | |

FOREIGN PATENT DOCUMENTS

| | | |
|---|---|---|
| GB | 1288571 | 9/1972 |
| GB | 2098846 A | 12/1982 |
| WO | PCT/US2018/053910 | 10/2018 |

OTHER PUBLICATIONS

VL-2882 Hay Saver Feeder, klenepipe.com:80/vl-2882-hay saver-feeder/ klenepipe.com Oct. 31, 2016.
Single Round Grazing Hay Feeder, millstreammarketing.com accessed May 2017.
Cattle Hay Feeder Square Bale Feeder With Tray, bordinbros.com Mar. 9, 2017.
Search Report dated Jan. 17, 2019, enclosed 15 pages.

* cited by examiner

PLANT MATERIAL FEEDER FOR ANIMALS

BACKGROUND AND TECHNICAL FIELD

One useful embodiment or variation of the invention relates to the following field, although the invention may also relate to other fields and uses. The invention may have various embodiments and variations. The field is the field of feeders for animals, including livestock. One useful embodiment is a feeder that handles hay bales.

DESCRIPTION OF RELATED ART

Typical of the art related to widely useful embodiments and variations of the present invention are following patents and publications. The following examples of related art and its limitations are illustrative and not exclusive. Other limitations of the related art will become apparent to those skilled in the art upon study of the specification and drawings of this application. Other embodiments and variations of the invention may relate to other arts and uses. Since their invention in 1936, hay bales have consistently been the most popular method used to feed livestock. (Livestock can include horses, cattle, goats, sheep and deer.) This method uses machinery to cut hay in the field and gather it into concentrated rows. It then collects the rows while compressing and forming it into uniform shapes and sizes. This method allows farmers and ranchers to store their hay for years before feeding, while maintaining good nutrient retention within the bale. When these bales are fed, they are either scattered on the ground around the pasture or set in a single place. After the amount of hay being wasted was recognized, the hay ring was invented in the 1970's. This helped control the waste slightly. Since the year 2000, hay prices have more than doubled and the hay bale feeder market was born. Publication US 2010/0263597, J. P. Kerns, published Oct. 21, 2010 discloses a Hay Feeder. U.S. Pat. No. 9,567,169, Feb. 14, 2017 to Camilletti discloses a hay feeder for large square bales. U.S. Pat. No. 5,158,040, Oct. 27, 1992 to P. Martin discloses an animal feeder for round bales

SUMMARY

One of the widely useful embodiments and variations of the present invention may be summarized as follows. This embodiment or variation is exemplary only. Other embodiments and variations will become apparent to those skilled in the art upon study of the specification and drawings of this application. Other embodiments and variations of the invention may relate to other arts and have usefulness in those arts.

There are at least two versions of the feeder, the Simple version (FIGS. 1-7, and a Complex version (FIGS. 8-9).

All references in the Application to FIGS. 21 and 22 are to be regarded as references to FIGS. 8 and 9 respectively. The Figures have not been changed except for the numbering of the Figures.

The feeder is an animal feeder used to safely and efficiently distribute nutrients in various forms including (but not limited to) Round Bales, Big Square Bales, (industry defines this to also include rectangular bales), Small Square Bales, Grain and Pellets. The feeder is separated into three sections: the Hay Bunker 33, the Feeder Cone 31, and the Feeder Base 30. The hay Bunker 33 is a large, enclosed area located above the Feeder Cone 31 that holds the majority of the animal feed and allows it to move freely in a downward, vertical direction into the Feeder Cone 31. The Feeder Cone 31 is built from inwardly sloping Cone Side Members 15 attached at their top to the Side Horizontal Members 9 on each of the four Side Frames 8 of the Feeder Stack 32. The Cone Side Members 15 are all attached together at their bottom with the Cone Joining Plate 14 creating the conically shaped Feeder Cone 31. This Feeder Cone 31 is shaped to limit how quickly the animals can consume the feed contained within. Under the Feeder Stack 32 and the Feeder Cone 31 is the Feeder Base 30. The Feeder Base 30 is a square shape with eight parallel Base Legs 3 protruding downward and equally spaced, and a raised Base Top Rail 2 and Tray Outside Solid Panel 6 to enclose the topside of the Feeder Base 30 and create an enclosed Tray 34. The Feeder Stack 32 is connected centrally to the topside of the Feeder Base 30 and protrudes outward in all directions from the bottom of the Feeder Cone 31 where the Feeder Base 30 catches any animal feed that should fall through the Feeder Cone 31 while the animals are feeding.

In the complex version, on the Base there are horizontal bars that surround the bottom, perimeter of the feeder to enclose the base which restricts animals from venturing under the feeder. There are also separate horizontal bars located on two opposing sides of the base that create a space used for equipment to lift the feeder and move to new locations. In the Complex version, the Side Frames 14 and Door Frames 26 have upward and downward facing "U" shapes and vertical support bars that restrict animals from accessing feed contained within the Feeder Stack 32.) There are two Door Frames 26, both frontwardly facing, left and right, and attached to Side Frames 14 of the feeder with Door Hinge Top 27 and Door Hinge Bottom 16 so the Door Frames 26 can be moved to an open position and feed can be deposited into the Hay Bunker 49 replenishing its supply. There are two Door Holding Chains 22 (FIG. 1) affixed to the front most sides of the left and right Side Frames 8 (FIG. 1) used to hold the Door Frames 26 in their open position. There is also one Door Closing Chain 21 (FIG. 1) affixed to the left and right Doors 35, that slides through Door Chain Fastening Plate 23 which is affixed to the left Door. The figures represent all features of this product being constructed from round tubing but it is also possible to use other structural shapes to achieve the same results.

PURPOSES AND ADVANTAGES

The invention may have various embodiments and variations and may be useful in different fields and for different purposes. The purposes and advantages of the more widely useful embodiments or variations of the present invention include, but are not limited to, the following, and may include other purposes and advantages in different fields of use not listed herein.

The main differences between this feeder and alternatives on the market are as follows: The feeder uses all round, bent pipe eliminating sharp edges from "cut-and-weld" corners and joints.

With respect to dangerous catch points made by "V" geometries that exist on alternative feeders in their steel structure, the feeder intentionally avoids this geometry making it the safest feeder on the market; the animals do not get their heads or necks caught in the feeder.

The feeder keeps the hay off the ground while the livestock feeds eliminating manure contamination and ground parasites. Ground parasites can include bots, roundworms, tapeworms and Equine Protozoal Myeloencephalitis (EPM).

The feeder has a tray positioned directly under where the hay bale is loaded into the feeder. This tray catches virtually all hay that is dropped from the livestock's mouth when feeding.

Livestock eating follow the "theory of least resistance" principle, so they will eat the most easily accessible hay first. The "theory of least resistance" postulates that animals, people, even well-designed machines will naturally choose the path of least resistance or effort. That hay is what is lying in the catch tray. That will get consumed before the livestock continues to pull new hay from the hay bale. By forcing the livestock to feed from within the Feeder Cone 31 placed below the Hay Bunker 33, the livestock must eat from hay that is pressurized from hay on top of it in the Hay Bunker 33. This forces the livestock to eat more slowly, thus greatly reducing waste and feeding-based medical conditions.

FUNCTIONAL DESCRIPTION OF ONE EMBODIMENT

The feeder is designed to feed all types of hay bales. These bales include big square bales (4'×4'×8', 4'×3'×8', 3'×3'×8', H×W×L), big round bales (4'×4', 4'×5', 4'×6', 5'×5', 5'×5.5' 5'×6', L×OD) and even small square bales. The feeder can be separated into 4 main sections.
1. The Hay Bunker 33, where the bulk of the hay sits before it's fed into the Feeder Cone 31.
2. The Feeder Cone 31, which the hay falls into, and which controls how the hay is dispensed to the animals.
3. The Tray 34 which keeps the hay completely off the ground and catches all the loose hay as the animals feed.
4. The Feeder Base 30, which supports the entire feeder and may have 4 skis built into the bottom (not shown in FIG. 1) for ease of moving. The feeder is built so it can be moved with or without hay in it by dragging with a piece of equipment.

The feeder has 2 Doors 35 secured with a Door Holding Chain 22 on the Hay Bunker 33. A person opens those doors to expose the entire inside of the Hay Bunker 33. In this position the hay can easily be loaded by almost any hay handling equipment. After the hay is completely in the feeder, the doors can be shut and the hay will automatically start feeding into the Feeder Cone 31.

As the animals come to feed, they reach their head over the outermost part of the Tray 34 into the hay filled cone. Because of the cone design, the hay will be slightly compacted making it more difficult for the animals to take large bites of hay. This means they will take exactly the amount of hay in each bite that they will actually consume. This reduces the waste immensely and allows us to achieve up to 97% efficiencies. As the animals deplete the supply of hay in the cone, more hay is automatically fed into it from the Hay Bunker 33.

To move the feeder, simply tie a chain around the base of the feeder and pull in the direction of the incorporated skis attached to the Base Legs 3 (not shown) with any piece of power equipment.

DESIGN SUMMARY

The Inventors have developed a livestock feeder designed to efficiently feed multiple sizes of hay bales while increasing the overall health of the animals. These bales include all round bales under 72" in diameter and 54" in length and all square bales under 48" in width, 48" in height and 96" in length. This feeder is easily implemented into the farmer and rancher's existing operation since there is no special equipment required to load the bale or move the feeder.

One embodiment of the feeder is made from 1.900" OD Pipe with 0.095" wall thickness, 1.660" OD Pipe with 0.095 wall thickness, and ½"×13-15 flattened expanded metal, and 16 ga sheet. The Tray 34 The plastic tray is a high density thermoplastic which is vacuum formed to final dimensions. This tray is made of (2) identical halves which, when both are slightly tilted upwards can be slid together and locked together in place. This tray is roughly 7.5'×7.5'×8", and the Feeder Base 30 is about 7.5'×7.5'.

FIGURES PARTS LIST (SIMPLE VERSION—FIGS. 1-7)

1 Base Bottom Frame Outside
2 Base Top Rail
3 Base Leg
4 Base Tray Support
6 Tray Outside Solid Panel
7 Tray Bottom Solid Panel
8 Side Frame
9 Side Horizontal Member
10 Door Hinge Bottom
11 Side Solid Panel Left
12 Side Solid Panel Right
13 Side Solid Panel Back
14 Cone Joining Plate
15 Cone Front or Side Member
16 Cone Mounting Hinge
17 Cone Front Mounting Member
18 Door Frame
19 Door Hinge Top
21 Door Closing Chain
22 Door Holding Chain
23 Door Chain Fastening Plate
24 Door Solid Panel
25 Side Back Corner Frame
26 Side Back Corner Solid Panel
27 Cone Bottom Clamp Plate
28 Cone Plate Clamp Bolt
29 Base Bottom Frame Inside
30 Feeder Base
31 Feeder Cone
32 Feeder Stack
33 Hay Bunker
34 Tray
35 Door

FIGURES PARTS LIST (COMPLEX VERSION—FIGS. 21 AND 22)

101 Base Bottom Frame Outside
102 Base Top Rail
103 Base Riser
104 Base Leg
105 Base Tray Support
107 Base Lower Horizontal Support
108 Base Lower Corner Rail
109 {Same as 105}
110 Base Leg Support
111 Base Center Support
112 Tray Insert
113 Tray Holding Washer
114 Side Frame
115 Side Horizontal Member
116 Door Hinge Bottom 117 Door Holding Chain
118 Inverted Substantially U-shaped Side frame member
119 Side Vertical Member
120 Base Short Leg
121 Cone Joining Plate
122 Base Long Leg
123 Cone Side Member
124 Cone Mounting Hinge
125 Cone Front Mounting Member
126 Door Frame
127 Door Hinge Top
128 Feeder Cone
129 Base
130 Door Chain Fastening Plate
131 Side Back Corner Frame Vertical Member
132 Side Back Corner Frame
133 Side Clamp Plate
134 Vertical Member
136 Side Clamp Fastener Assembly
137 Cone Bottom Clamp Plate
138 Cone Plate Clamp Bolt
139 Leg Stop Collar
148 Door Closing Chain
149 Hay Bunker

BRIEF DESCRIPTION OF THE DRAWINGS

This Brief Description and the Detailed Description Of The Drawings cover only some embodiments and variations of the invention, and other embodiments and variations will be clear to those skilled in the art from the description, drawings, and Alternative and Additional Embodiments, etc. The Drawings are illustrative and not limiting.

FIG. 1 is a front facing, planar view where the Feeder Stack 32 contains within it the Feeder Cone 31.

FIG. 2 is a back facing, planar view where the Feeder Stack 32 contains within it the Feeder Cone 31.

FIG. 3 is a left facing, planar view where the Feeder Stack 32 contains within it the Feeder Cone 31.

FIG. 4 is a right facing, planar view where the Feeder Stack 32 contains within the Feeder Cone 31.

FIG. 5 is a top facing, planar view showing Base Top Rail 2 attached to Tray Outside Solid Panel 6 creating an enclosed area on the top side of Feeder Base 30.

FIG. 6 is a front trending, isometric view where the Feeder Stack 32 contains within it the Feeder Cone 31 attached to the Base 30.

FIG. 7 is a bottom facing planar view where 8 units of Base Leg 3 are attached to Base Bottom Frame Outside 1

FIG. 8 shows a perspective view of a more Complex version of the feeder, with a more complex Base 129, the Hay Bunker 149 with more complex sides including inverted substantially U-shaped side frame members 118, and Feeder Cone 128.

FIG. 9 is a bottom perspective view of a more Complex version of the feeder, with a more complex Base 129, the Hay Bunker 149 with more complex sides including inverted substantially U-shaped side frame members 118, and Feeder Cone 128.

DETAILED DESCRIPTIONS OF THE DRAWINGS

Figure 1:
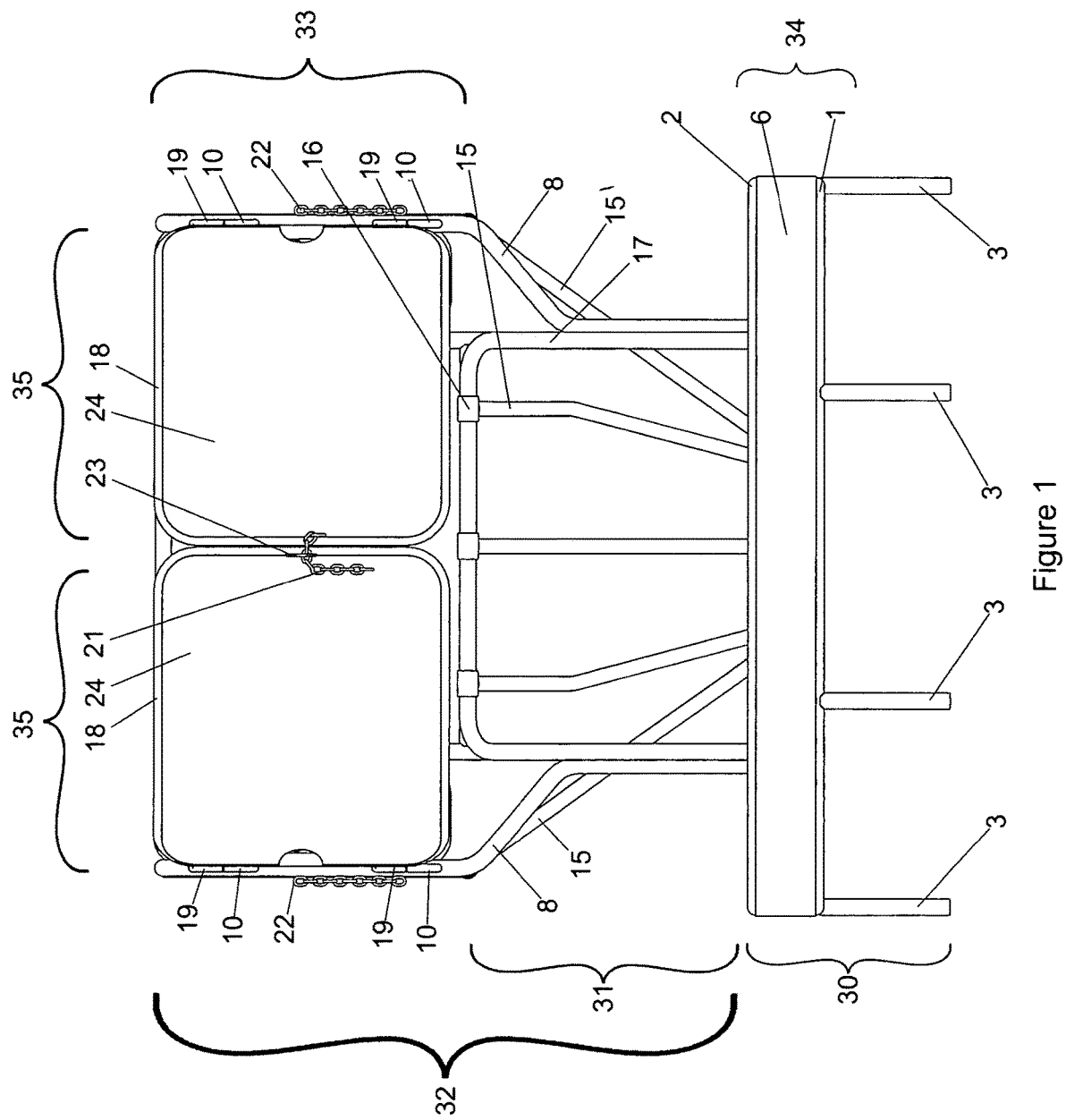
FIGS. 1-7 describe one simple embodiment of the feeder.

FIG. 1 is a front facing, planar view where the Feeder Stack 32 contains within it the Feeder Cone 31 attached to Cone Front Mounting Member 17. The Feeder Stack 32 is attached centrally to the topside of the Feeder Base 30. The Feeder Base 30 stands on 8 Base Legs 3 which are attached to the Base Bottom Frame Outside 1. Attached to the perimeter of Base Bottom Frame Outside 1 is Tray Outside Solid Panel 6 which extends upwardly. Base Top Rail 2 attaches to Tray Outside Solid Panel 6 creating an enclosed area on the top side of Feeder Base 30. The Feeder Stack 32 shows the left and right Side Frame 8 attached to the interior, topside of the Feeder Base 30 and attached to Side Horizontal Members 9 (not pictured, see FIG. 2) and Cone Front Mounting Member 17. Attached to the frontwardly facing sides of the left and right Side Frame 8 are the left and right Door Frames 18, which are affixed to the frontwardly facing sides of the left and right Side Frame 8 by Door Hinge Bottom 10 and Door Hinge Top 19. Left and right Door Frames 18 enclose Door Solid Panel 24. When left or right Door Frame 18 are pivoted about an axis that extends vertically and concentrically through Door Hinge Top 19 and Door Hinge Bottom 10, Door Holding Chain 22 is used to fix Door Frame 18 in the open position. Door Closing Chain 21 slides through Door Chain Fastening Plate 23 which fixes left and right Door Frame 18 in their closed position. Cone Side Members 15 are shown attached by Cone Mounting Hinges 16. The left and right Doors 35, the Hay Bunker 33, and the Tray 34 are also shown.

Figure 2:
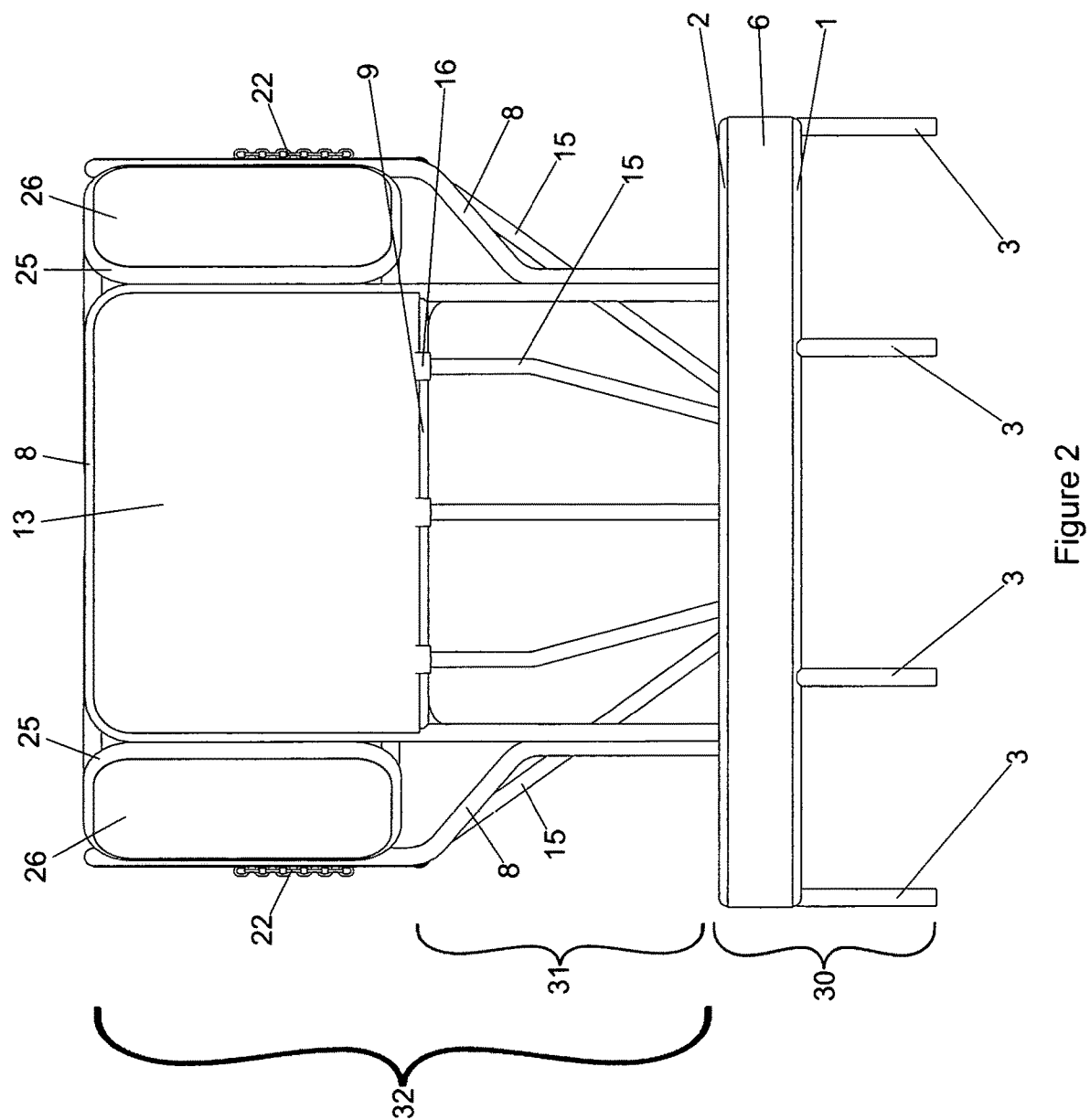

FIG. 2 is a back facing, planar view where the Feeder Stack 32 contains the Feeder Cone 31 attached by 12 Cone Mounting Hinges 16. The Feeder Stack 32 is attached centrally to the topside of the Feeder Base 30. The Feeder Base 30 stands on 8 Base Legs 3 which are attached to the Base Bottom Frame Outside 1. Attached to the perimeter of Base Bottom Frame Outside 1 is Tray Outside Solid Panel 6 which extends upwardly. Base Top Rail 2 attaches to Tray Outside Solid Panel 6 creating an enclosed area on the top side of Feeder Base 30. The Feeder Stack 32 shows the left and rear Side Frame 8 and Cone Front Mounting Member 15 attached to the interior, topside of the Feeder Base 30, and, hanging from Side Horizontal Members 9 on left, right and rear sides, and front side are Cone Side Members 15 attached by Cone Mounting Hinges 16. The Hay Bunker 33 (FIG. 1) is enclosed by 3 units of Side Frame 8, 2 units of Side Back Corner Frame 25 which enclose Side Back Corner Solid Panel 26 and 2 units of Door Frame 18 (FIG. 1). The rear most Side Frame 8 encloses Side Solid Panel Back 13. Door Holding Chain 22 is used to fix Door Frame 18 (FIG. 1) in the open position.

Figure 3:
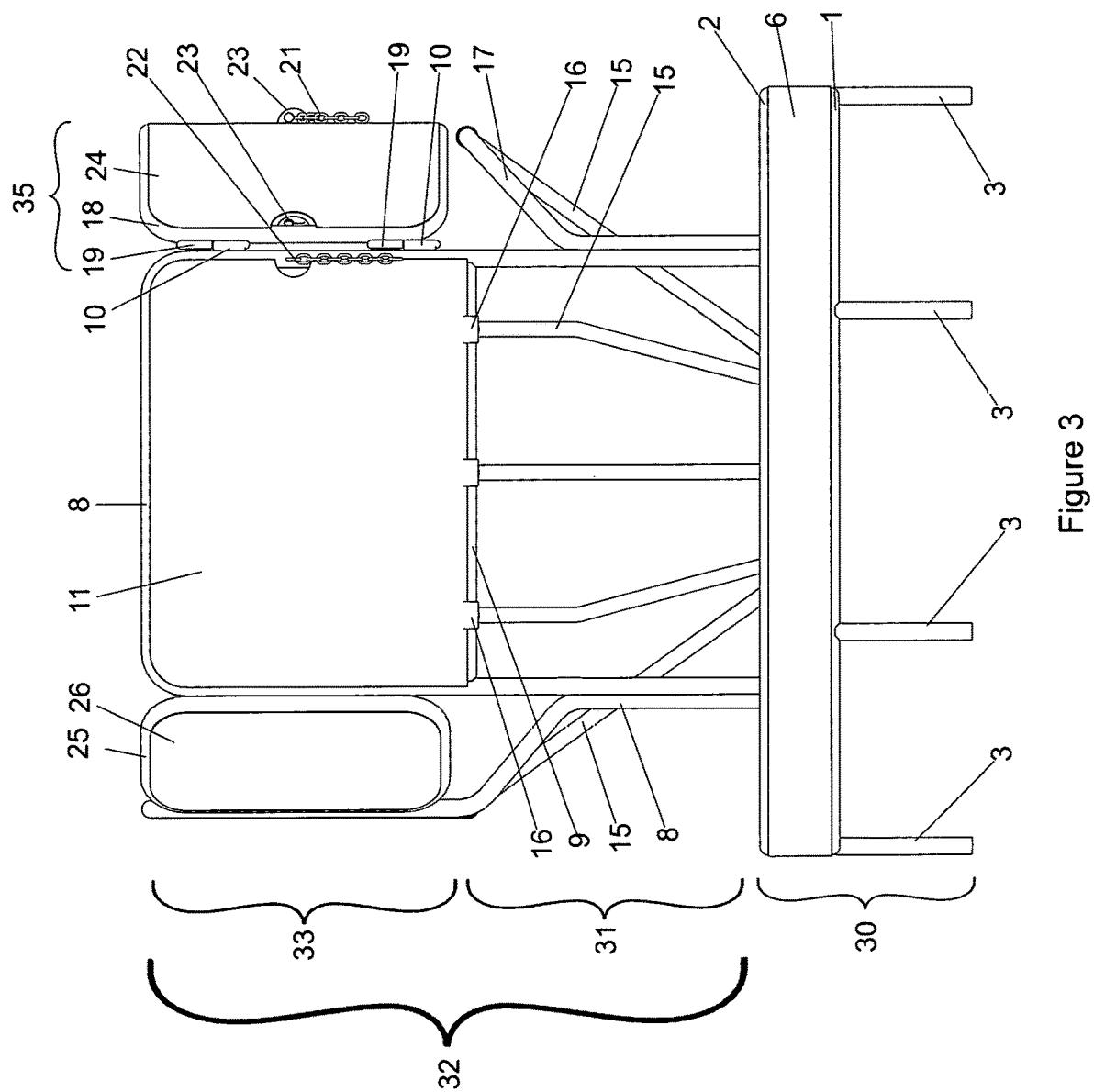

FIG. 3 is a left facing, planar view where the Feeder Stack 32 contains within it Feeder Cone 31 attached by 12 Cone Mounting Hinges 16. The Feeder Stack 32 is attached centrally to the topside of the Feeder Base 30. The Feeder Base 30 stands on 8 Base Legs 3 which are attached to the Base Bottom Frame Outside 1. The portion of the structure below the Hay Bunker 33 shows essentially the same parts as in FIGS. 1 and 2. In this Figure, the Side Solid Panel Left 11 is shown, as well as Side Back Corner Frame 25 and Side Back Corner Solid Panel 26. Side Frame 8 is shown. The left door 35, Door Frame 18 and the left Door Solid Panel 24 are shown pivoted into the open Position. Cone Front Mounting Member 17 is also shown. When left or right Door Frame 18 is pivoted about an axis that extends vertically and concentrically through Door Hinge Top 19 and Door Hinge Bottom 10, Door Holding Chain 22 is used to fix Door Frame 18 in the open position. Door Closing Chain 21 slides through Door Chain Fastening Plate 23 which fixes left and right Door Frames 18 in their closed position.

Figure 4:
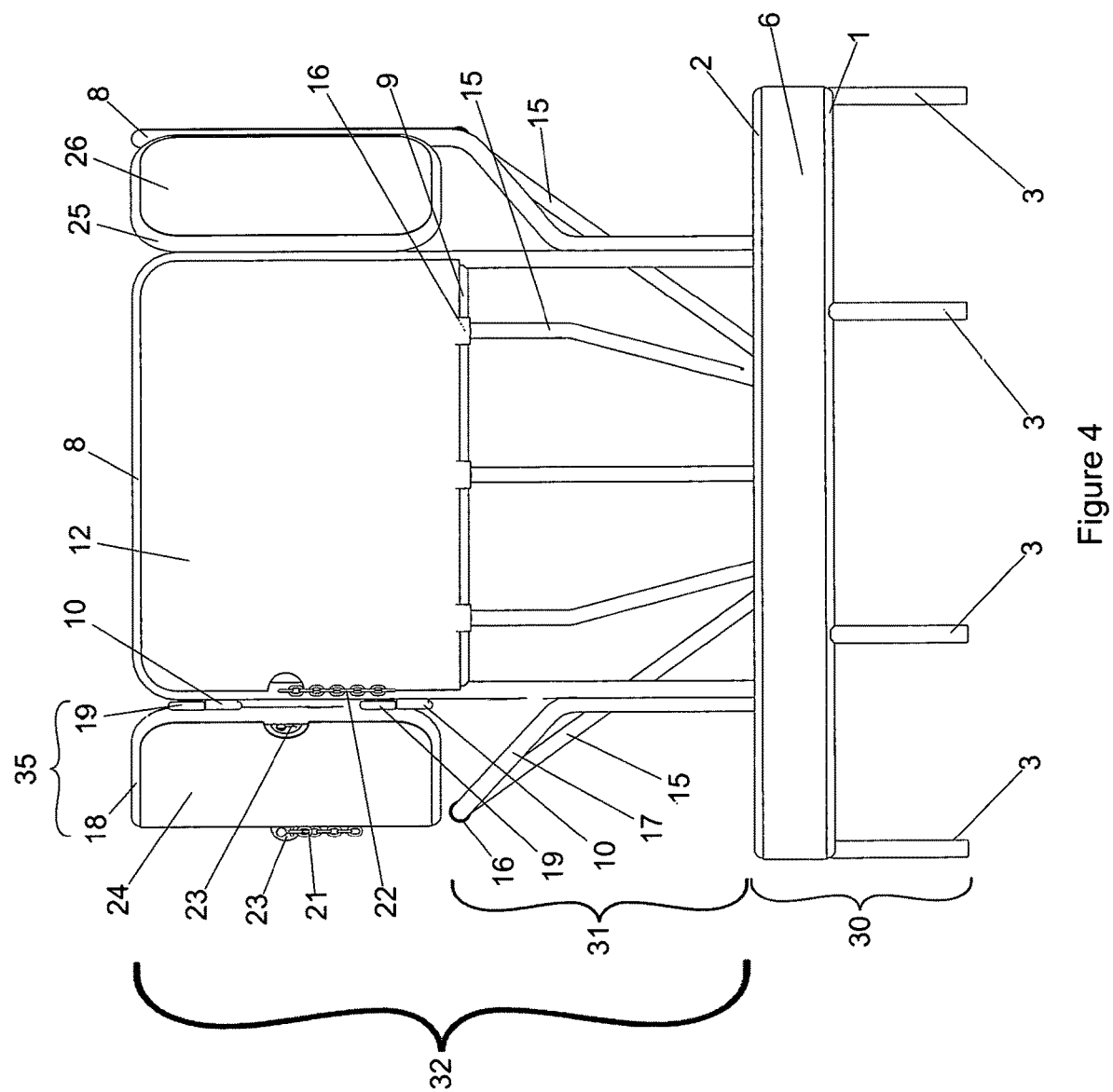

FIG. 4 is a right facing, planar view where the Feeder Stack 32 contains within it the Feeder Cone 31 attached by 12 Cone Mounting Hinges 16. The Feeder Stack 32 is attached centrally to the topside of the Feeder Base 30. Since the structure is symmetrical, the figure shows essentially the same parts as FIGS. 3, 2, and 1, except that Side Solid Panel Right 12 is now shown, and Door 35, the right Door Frame 18 and right Door Solid Panel 24 are shown in the open position. Side Frame 8 is shown. When right Door Frame 18 is pivoted about an axis that extends vertically and concentrically through Door Hinge Top 19 and Door Hinge Bottom 10, Door Holding Chain 22 is used to fix Door Frame 18 in the open position. Door Closing Chain 21 slides through Door Chain Fastening Plate 23 which fixes right Door Frame 18 in its closed position. Side Back Corner Frame 25 and Side Back Corner Solid Panel 26 are shown. Side Horizontal Member 9 is shown. Cone Front Mounting Member 17 is shown. The portion of the structure below the Hay Bunker 33 (FIG. 3) shows essentially the same parts as in FIGS. 1, 2, and 3.

Figure 5:
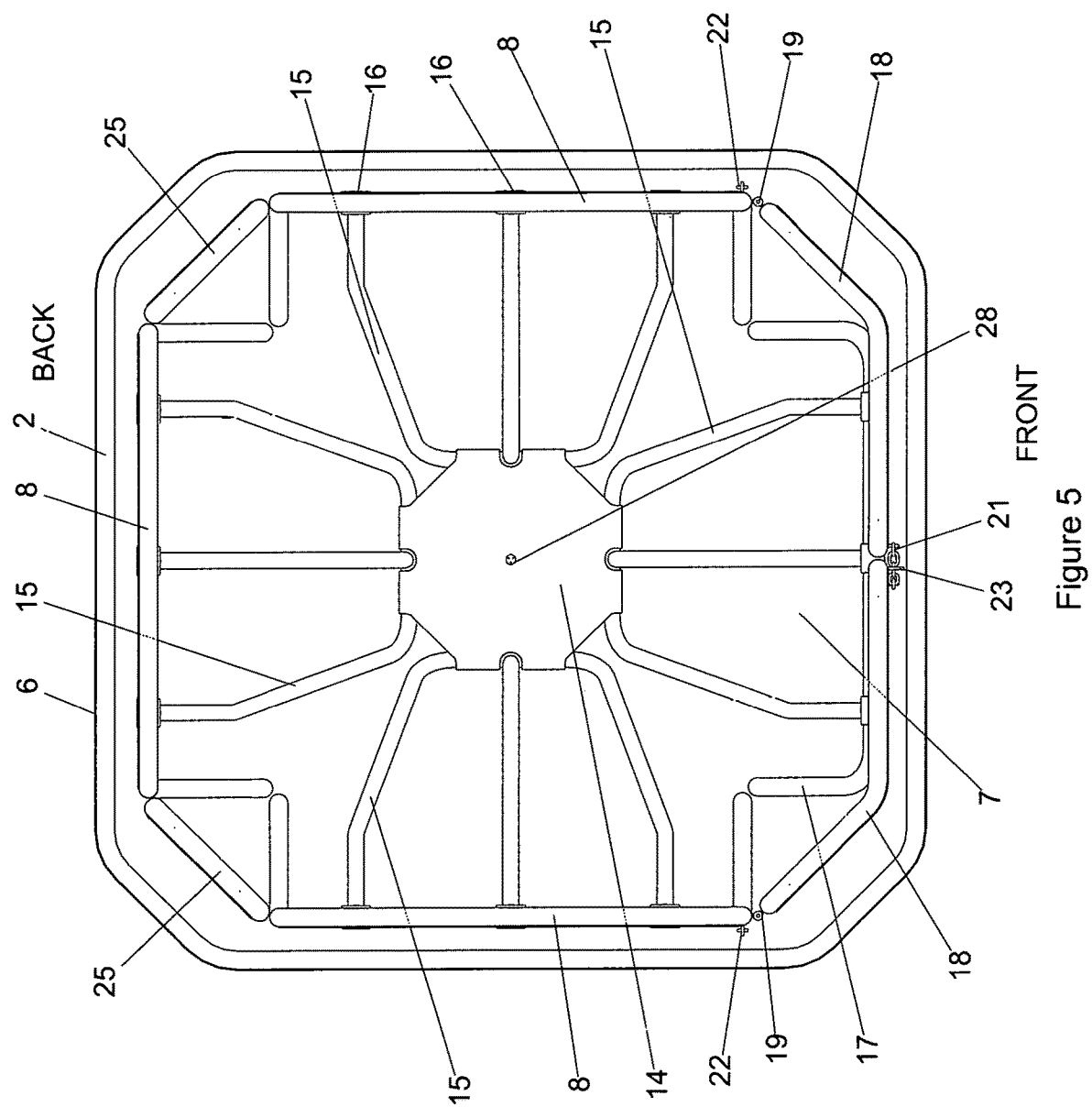

FIG. 5 is a top facing, planar view where Base Top Rail 2 attaches to Tray Outside Solid Panel 6 creating an enclosed area on the top side of Feeder Base 30 (see FIG. 2). The left, right and rear Side Frame 8 are attached to the interior, topside of the Feeder Base 30, and hanging from Side Horizontal Members 9 (not pictured, see FIG. 2) on left, right and rear sides, are Cone Side Members 15 attached by Cone Mounting Hinges 16. Attached to the frontwardly facing sides of the left and right Side Frames 8 are the left and right Door Frames 18 which are affixed to the frontwardly facing sides of the left and right Side Frames 8 by Door Hinge Bottom 10 (not shown) and Door Hinge Top 19 which is fixed to Door Frame 18. When left or right Door Frames 18 are pivoted about an axis that extends vertically and concentrically through Door Hinge Top 19 and Door Hinge Bottom 10, Door Holding Chain 22 is used to fix Door Frames 18 in the open position. Door Closing Chain 21 slides through Door Chain Fastening Plate 23 which fixes left and right Door Frames 18 in their closed position. On the topside of Base Bottom Frame Outside 1 (which is directly below Base Top Rail 2, but not shown here, but is shown in FIG. 1) is Tray Bottom Solid Panel 7 which covers the entire area of Base Bottom Frame Outside 1. Side Back Corner Frames 25 are shown, as well as Cone Joining Plate 14, and Cone Plate Clamp Bolt 28. Cone Front Mounting Members 17 are shown.

Figure 6:
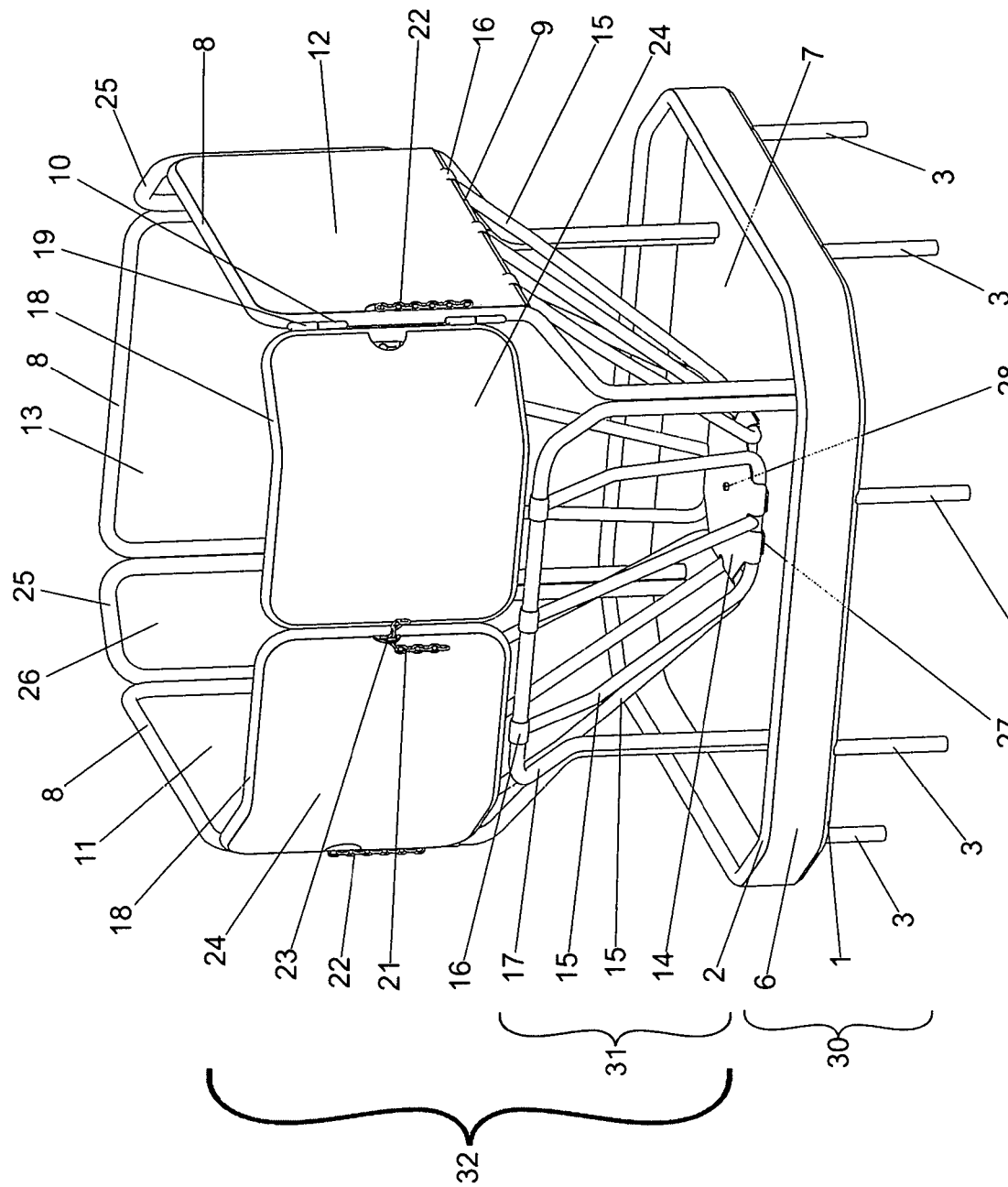

FIG. 6 is a front trending, isometric view where the Feeder Stack 32 contains the Feeder Cone 31 attached by 12 Cone Mounting Hinges 16. The Feeder Stack 32 is attached centrally to the topside of the Feeder Base 30. The parts are essentially the same as shown in FIGS. 1-5, and Cone Bottom Clamp Plate 27 is shown.

Four groups of Cone Side Members 15 are pictured attached to a Cone Mounting Hinges 16 on each of the 4 sides of the feeder. All 9 units of Cone Side Members 15 are affixed together at their bottoms by clamping the bottoms between Cone Joining Plate 14 and Cone Bottom Clamp Plate 27. Cone Plate Clamp Bolt 28 is inserted vertically through a hole in the center of Cone Joining Plate 14 and threaded into Cone Bottom Clamp Plate 27. On the topside of Base Bottom Frame Outside 1 is Tray Bottom Solid Panel 7 which covers the entire area of Base Bottom Frame Outside 1. Cone Front Mounting Member 17 is shown.

Figure 7:
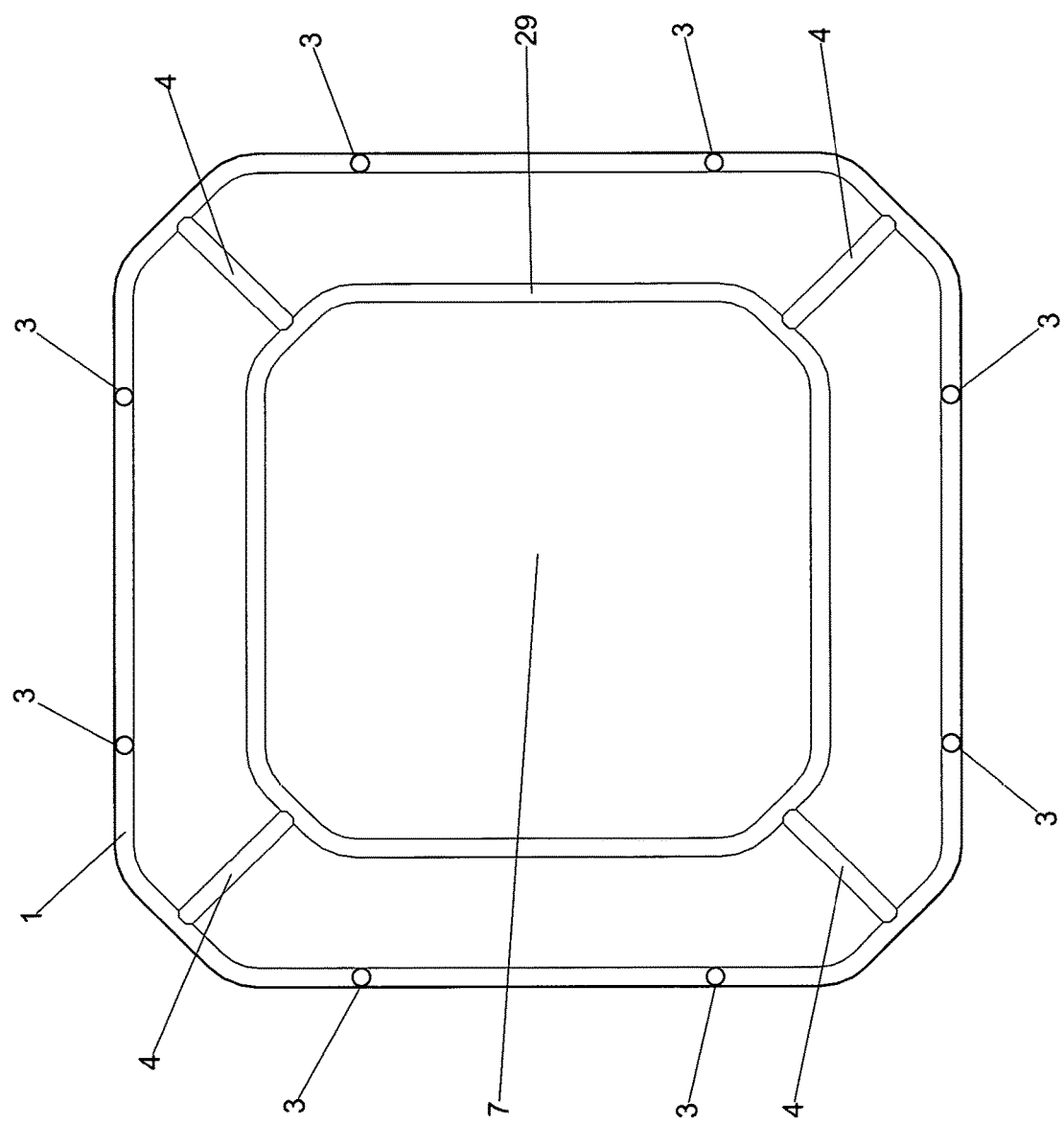
Figure 8:
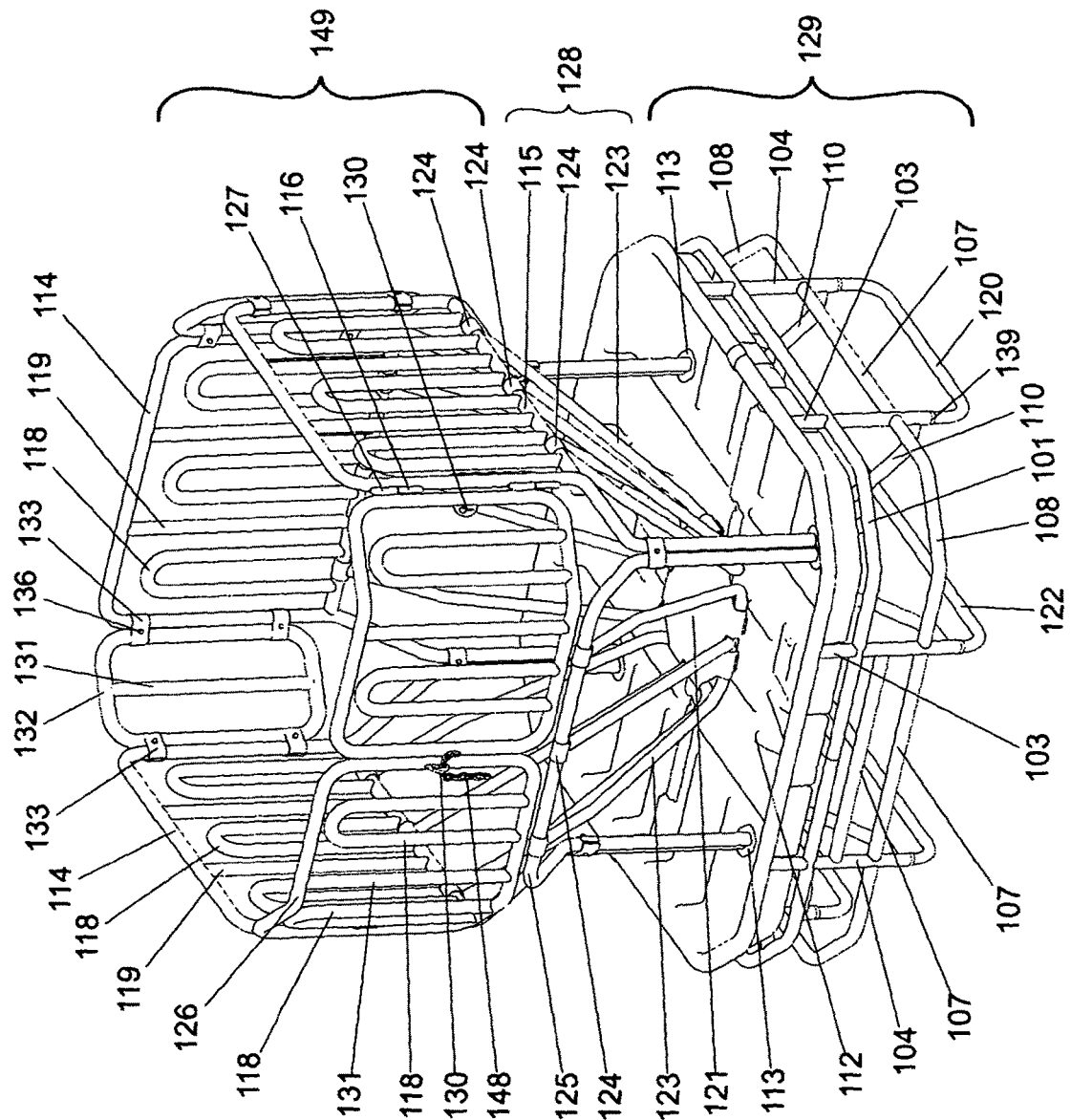
FIGS. 8 and 9 show a complex version of the feeder.
Figure 9:
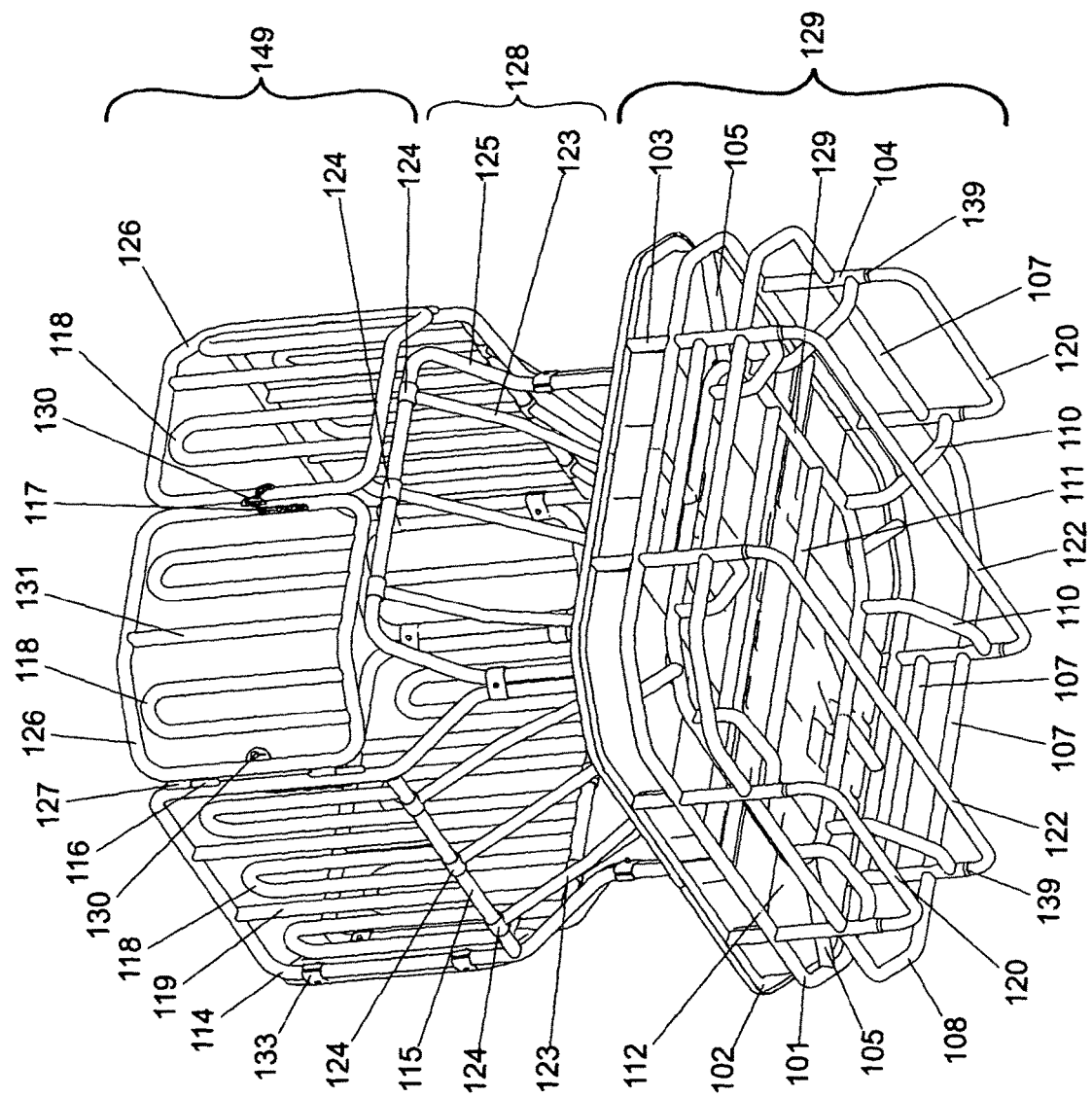

FIG. 7 is a bottom facing plan view where 8 units of Base Leg 3 are attached to Base Bottom Frame Outside 1 and 4 units of Base Tray Support 4 are affixed horizontally in each of the 4 corners of Base Bottom Frame Outside 1. On the topside of Base Bottom Frame Outside 1 is Tray Bottom Solid Panel 7 which covers the entire area of Base Bottom Frame Outside 1. Also shown is 29 Base Bottom Frame Inside.

FIG. 21 shows the more complex version of the feeder. The main parts are the Hay Bunker 149, the Feeder Cone 128, and the Base 129. The top portion is similar to the simple version. Shown are 2 Door Frames 126, Side Frame 114, Side Vertical Member 119 in the Frame, 3 inverted substantially U-shaped side frame members 118, Side Back Corner Frame 132, containing Side Back Corner Frame Vertical Member 131. The Side Back Corner Frame 132 is attached to Side Frame 114 by Side Clamp Fastener Assembly 136 and Side Clamp Plate 133. Side Back Corner Frame 132 is attached the left Side Frame 114 by Side Clamp Plate 133. Side Frame 114 contains 2 Side Vertical Members 119 and 3 inverted substantially U-shaped side frame members 118. The left Door Frame 126 is shown containing a Vertical Member 134 as well as 2 inverted substantially U-shaped side frame members 118. Also shown are Door Chain Fastening Plate 130 and Door Closing Chain 148. On the right Door Frame 126 are shown Door Hinge Bottom 116 and Door Hinge Top 127, as well as Door Holding Chain 117.

On the right side of Hay Bunker 149, are shown Cone Mounting Hinges 124 and Side Horizontal Member 115. In the front bottom of the Hay Bunker 149 are shown Cone Mounting Hinges 124 and Cone Front Mounting Member 125. In the Feeder Cone 128 area are shown Cone Side Members 123. In the front Feeder Cone 128 area, are shown Cone Side Members 123 as well as Cone Joining Plate 121, and Tray Holding Washer 113. In the Base 129 area the following are shown: Tray Insert 112, Base Leg 104, Base Lower Horizontal Support 107, Base Riser 103, Base Long Leg 122, Base Lower Corner Rail 108, Base Bottom Frame Outside 101, Base Leg Support 110, Leg Stop Collar 139, Base Short Leg 120.

FIG. 22 is the same as FIG. 21 except it is a perspective view from the bottom left of the feeder. The main parts are shown: Hay Bunker 149, Feeder Cone 128, and Base 129. All of the parts in this drawing are shown in FIG. 21 except the following which are shown in FIG. 22: Base Top Rail 102, Base Tray Support 105, Base Center Support 111.

There are many bars in the base. Many bars around the perimeter of the feeder are to discourage young animals from venturing underneath. On two sides opposite each other, there are two horizontal bars close to each other, 107 Base Lower Horizontal Supports. The forks of a forklift can be placed between those Supports and they engage 101 Base Bottom Frame Outside and 111 Base Center Support, in order to lift and transport the feeder.

Operation of One Embodiment

The feeder is transported to the desired location accessible to animals, including by a forklift or crane. Hay bales, or loose hay or other animal feed is placed in the hay bunker through the open top or the doors. The hay moves down into the feeder cone by mean of gravity, and the animals eat the plant material by putting their mouths through the bars of the feeder cone.

CONCLUSIONS, RAMIFICATIONS AND SCOPE

A number of changes are possible to the methods, parts, uses described above while still remaining within the scope and spirit of the invention. The specifics about the form and use of the invention described in this application (including the specifics in the Background, Field, Related Art, Summary, Purposes and Advantages, Abstract, Descriptions of the Drawings, etc.) are examples and are not intended to be limiting in scope. Those skilled in the art will recognize certain variations, modifications, permutations, additions, subtractions and sub-combinations thereof, and may discover new fields of use. The scope of the invention is to be determined by the claims and their legal equivalents, not the examples, purposes, summary, operation, parameters, or limitations etc. given above. It is intended that the claims are interpreted to include all such variations, modifications, additions, subtractions, permutations and sub-combinations as are within their true spirit and scope, including those which may be recognized later by those skilled in the art.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used.

We claim:

1. A plant material feeder for animals comprising: (a) a substantially rectangular-cube-shaped hay bunker, (b) a feeder cone, and (c) a feeder base containing a tray, wherein the hay bunker includes one or more side back corner solid panels and one or more openable doors for receiving the plant material, wherein the feeder cone has the shape of an inverted four-sided truncated pyramid with a rectangular or square base, wherein the pyramid is truncated at the top of the pyramid by a plane parallel to the pyramid base, thus producing four sides of the pyramid with regular trapezoidal shapes, wherein the hay bunker is positioned above the feeder cone above the inverted pyramid base, and the feeder cone at its inverted truncated top is attached directly to the feeder base, and wherein the hay bunker is supported above, and attached to, the feeder base by a plurality of inverted substantially U-shaped side frame members attached at their ends to the feeder base and extending upwardly from the feeder base.

2. The plant material feeder of claim 1, wherein the feeder cone comprises, in each of its four trapezoidal planes, four groups of linear cone side members, the axes of which converge downwardly toward the missing point of the inverted truncated pyramid, and wherein the lower ends of the cone side members are attached directly to the feeder base, whereby plant material, including hay bales, can be positioned in the hay bunker and said material will descend into the feeder cone, where it can be eaten by animals, which animals put their mouths into openings in the feeder cone between said cone side members.

3. The plant material feeder of claim 2, wherein the feeder base includes a plurality of base legs attached to the feeder base.

4. The plant material feeder of claim 2, further comprising a door closing chain, a door holding chain, and door chain fastening plate attached to the doors and capable of securing the doors in an open position or a closed position.

5. The plant material feeder of claim 2, wherein the base includes, on the bottom side, a base bottom frame outside, base lower horizontal supports, and a base center support, which are capable of engaging the forks of a forklift, whereby the plant material feeder may be lifted by the forklift and transported.

6. The plant material feeder of claim 1, wherein the doors in the hay bunker are capable of being opened by one of their edges pivoting around a top and a bottom door hinge, said hinges being attached to the side portions of the substantially inverted U-shaped side frame member attached at its two ends to the base and extending upwardly and comprising part of the outside of the hay bunker.

7. The plant material feeder of claim 6, further comprising an inverted U-shaped cone front mounting member and three side horizontal members, wherein the cone side members, in four groups, in their respective four trapezoidal planes, are attached at their tops to the bottom-U-shaped portion of the cone front mounting member, and to the three side horizontal members in sequence around the sides of the inverted pyramid, said bottom-U-shaped portion of the cone front mounting member being positioned just under the hay bunker and parallel to the bottom of the hay bunker and parallel to the feeder base, and wherein the cone side members are attached at their bottom ends directly to the feeder base.

8. The plant material feeder of claim 7, wherein the side back corner solid panels are surrounded by side back corner frames attached to said inverted U-shaped side frame members; and said side solid panels are attached on three of their sides to the bottom U-portion of the inverted substantially U-shaped side frame members.

9. The plant material feeder of claim 7, further comprising a cone joining plate, and a cone bottom clamp plate and a cone plate clamp bolt which secure the ends of the cone side members directly to the feeder base.

10. The plant material feeder of claim 7, wherein one group of cone side members is attached to the bottom-U-portion of the cone front mounting member, and the other three groups are attached to the side horizontal members, by cone mounting hinges.

11. The plant material feeder of claim 1, wherein the doors in the hay bunker are capable of being opened by one of their edges pivoting around a top and a bottom door hinge, said hinges being attached to the side portions of the substantially inverted U-shaped side frame member attached at its two ends to the base and extending upwardly and comprising part of the outside of the hay bunker.

12. The plant material feeder of claim 11, further comprising an inverted U-shaped cone front mounting member and three side horizontal members, wherein the cone side members, in four groups, in their respective four trapezoidal planes, are attached at their tops to the bottom-U-shaped portion of the cone front mounting member, and to the three side horizontal members in sequence around the sides of the inverted pyramid, said bottom-U-shaped portion of the cone front mounting member being positioned just under the hay bunker and parallel to the bottom of the hay bunker and parallel to the feeder base, and wherein the cone side members are attached at their bottom ends directly to the feeder base.

13. The plant material feeder of claim 12, wherein the side back corner solid panels are surrounded by side back corner frames attached to said inverted substantially U-shaped side frame members; and said side solid panels are attached on three of their sides to the bottom U-portion of the inverted U-shaped side frame members.

14. The plant material feeder of claim 12, further comprising a cone joining plate, and a cone bottom clamp plate and a cone plate clamp bolt which secure the ends of the cone side members directly to the feeder base.

15. The plant material feeder of claim 12, wherein one group of cone side members is attached to the bottom-U-portion of the cone front mounting member, and the other three groups are attached to the side horizontal members, by cone mounting hinges.

16. The plant material feeder of claim 1, wherein the feeder base includes a plurality of base legs attached to the feeder base.

17. The plant material feeder of claim 1, further comprising a door closing chain, a door holding chain, and door chain fastening plate attached to the doors and capable of securing the doors in an open position or a closed position.

18. The plant material feeder of claim 1, wherein the base includes, on the bottom side, a base bottom frame outside, base lower horizontal supports, and a base center support, which are capable of engaging the forks of a forklift, whereby the plant material feeder may be lifted by the forklift and transported.

* * * * *